Aug. 16, 1966 G. B. TOWNSEND 3,267,210
AUTOMATIC SATURATION CONTROL FOR COLOR-TELEVISION RECEIVER
Original Filed Oct. 7, 1959
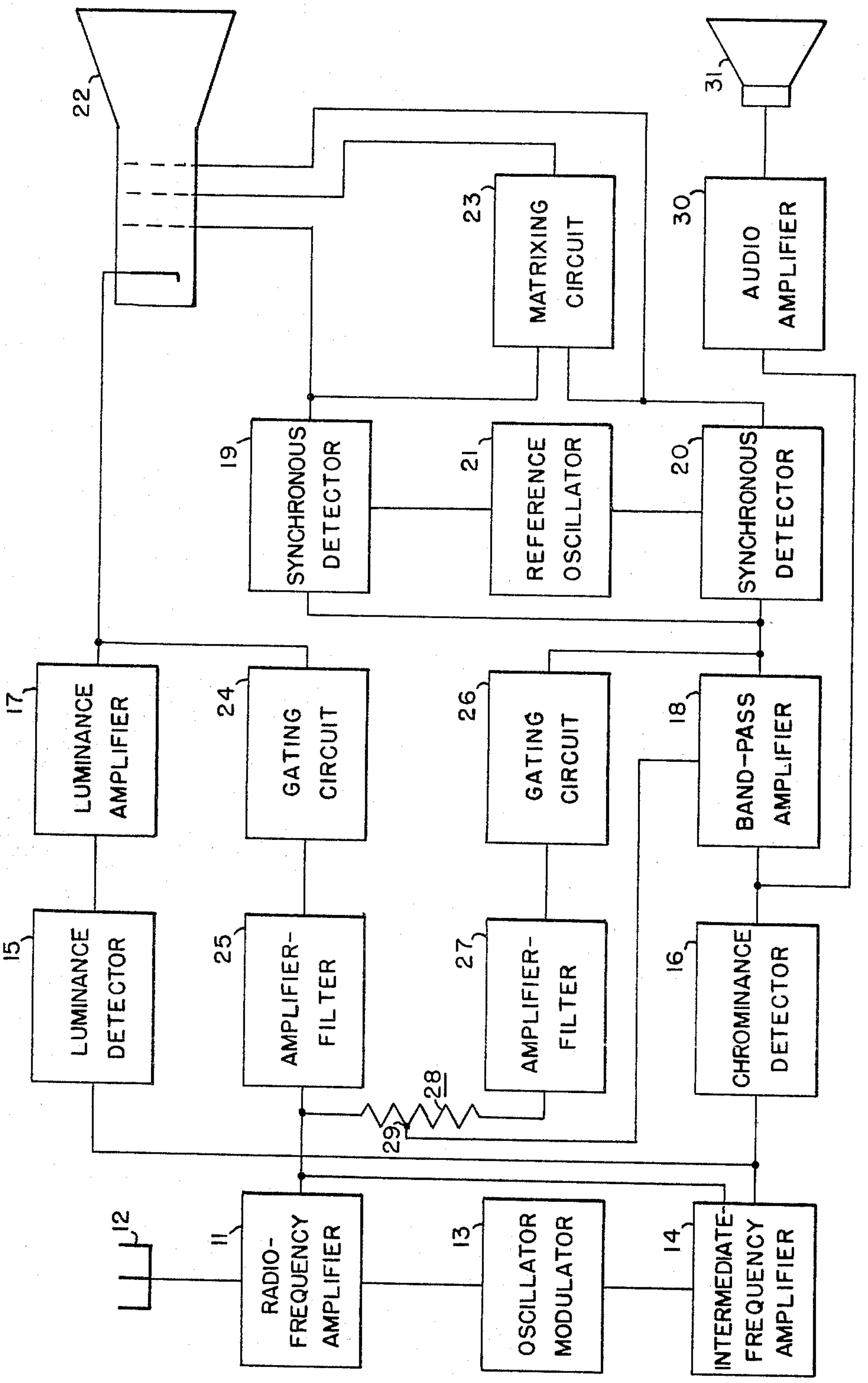

United States Patent Office 3,267,210
Patented August 16, 1966

3,267,210

AUTOMATIC SATURATION CONTROL FOR COLOR-TELEVISION RECEIVER

George B. Townsend, Little Chalfont, England, assignor to Hazeltine Research, Inc., Chicago, Ill., a corporation of Illinois Continuation of application Ser. No. 844,955, Oct. 7, 1959. This application July 17, 1963, Ser. No. 296,159
Claims priority, application Great Britain, Oct. 31, 1958, 35,009/58
7 Claims. (Cl. 178—5.4)

The invention relates to color-television receivers and is concerned, in particular, with color-television receivers of the kind adapted to reproduce a picture by the application of luminance and chrominance signals to a picture reproduction device. Throughout this specification the term "automatic-gain-control" will be abbreviated "AGC."

This application is a continuation of application Serial No. 844,955, now abandoned, filed October 7, 1959 and entitled "Color-Television Receiver."

In such a receiver the saturation of the color of an element of the reproduced picture depends on the ratio of the luminance signal level to the chrominance signal level at the picture reproduction device. It is desirable, therefore, to maintain this ratio at a predetermined constant value in operation. Normally this predetermined value will be such that the saturation of the color of an element of the reproduced picture corresponds with the saturation of the color of that element as represented by the transmitted signals.

In previous receivers, either no provision has been made for automatic control of the saturation of colors of a reproduced picture or else the means for achieving such automatic control have been more complicated or more difficult to install in existing designs of receivers than are the means taught in the present invention.

It is an object of this invention, therefore, to provide an improved color-television receiver wherein relatively simple and inexpensive means are provided for maintaining saturation at a predetermined level.

It is another object of the present invention to provide a color-television receiver wherein the ratio of the luminance signal level to the chrominance signal level at the picture reproduction device is automatically maintained substantially constant.

It is a further object of this invention to provide a color-television receiver wherein the setting of the contrast control may be changed with no resulting change in the saturations of the colors of the resulting picture.

It is an additional object of this invention to provide a color-television receiver wherein a separate saturation control is unnecessary.

It is an additional object of this invention to provide a color-television receiver wherein color saturation may be adjusted by the viewer and automatically maintained at a selected level.

According to the invention a color-television receiver comprises a source of modulated wave signals including a luminance signal channel for deriving a luminance signal and chrominance signal channel for deriving a chrominance signal, first means coupled to the source for deriving a first D.-C. voltage whose magnitude is proportional to the level of the luminance signal in the luminance channel, second means coupled to the source for deriving a second D.-C. voltage whose magnitude is proportional to the level of the chrominance signal in the chrominance channel, and third means for utilizing these first and second D.-C. voltages to derive a control signal, variations in which control signal are indicative of variations in saturation, and for utilizing this control signal to maintain the control signal and saturation substantially at predetermined values.

For a better understanding of the present invention, together with other and further objects thereof, reference is had to the following description taken in connection with the accompanying drawing, and its scope will be pointed out in the appended claims.

The drawing is a circuit diagram partly schematic, of a complete color-television receiver including the present invention. While grounding of the various components is not indicated in the drawing, it will be understood that a ground or common connection is used in a known manner to supply a reference potential.

Neglecting for the moment the present invention, the drawing represents in general a conventional superheterodyne color-television receiver. The operation of such a receiver is well understood in the art so that a detailed description thereof is unnecessary. The invention will be described by way of example with reference to a color-television receiver for the British equivalent of the National Television System Committee system. It will be apparent that this description applies equally to receivers designed for the NTSC system as used in the United States even though specific details differ. In this British system the transmitted picture is represented by a composite television signal consisting of interlaced frames each of 202½ lines and having a repetition frequency of 50 frames per second. This composite signal is transmitted as amplitude modulation of a main television carrier, being transmitted mainly as the lower side band, and is constituted by a luminance signal in which components of frequency up to 3 megacycles per second may be present and a pair of chrominance signals in which components of frequency up to 0.34 megacycle per second and 1 megacycle per second, respectively, may be present and which are respectively transmitted as amplitude modulations of a pair of subcarrier waves of the same frequency which are in phase quadrature, this subcarrier frequency being approximately 2.66 megacycles per second and its exact value being such that it lies exactly half-way between two adjacent harmonics of the line frequency.

The wave form of the television signal is such that during intervals between video signals representing successive lines of a frame there occur line synchronizing pulses each followed by a portion of the signal whose average value is maintained at a datum level. During this portion of the signal, color synchronizing reference information is transmitted in the form of a few cycles of a sinusoidal oscillation at the subcarrier frequency.

The receiver is of the superheterodyne type and includes a source of modulated wave signals, including a luminance signal channel for deriving a luminance signal and a chrominance signal channel for deriving a chrominance signal. This source may consist of radio-frequency amplifier 11 for amplifying the received composite television signals fed to it from antenna 12, and oscillator-modulator 13, in which the frequency of the main television carrier is converted to an intermediate frequency. The television signals are then fed via an intermediate-frequency amplifier 14 to a luminance signal channel whose first component is a luminance signal detector 15 and also to a chrominance signal channel whose first component is a chrominance signal detector 16. The output of the luminance signal detector 15 is fed to a luminance signal amplifier 17 and the output of the chrominance signal detector 16 is fed via a band-pass amplifier 18 to a pair of synchronous detectors 19 and 20, where red and green color-difference signals are respectively detected in known manner by the application, in appropriate phases, of a locally generated reference oscillation from oscillator 21 whose frequency and phase are automatically controlled in known manner in accordance with the transmitted color synchronizing reference information. The output of the luminance signal amplifier 17 is fed to the cathodes of the three electron guns of a picture reproduction device, illustrated as three-color kinescope 22, so as to produce a monochrome image on the screen of the kinescope. The outputs of the synchronous detectors 19 and 20 are fed to a matrixing circuit 23, which produces a blue color-difference signal, the three color-difference signals being respectively fed to the three grids of the kinescope 22, thereby adding color information to the monochrome picture. Audio amplifier 30 receives audio information from chrominance detector 16 and, in turn, feeds sound reproducer 31.

The output of the luminance signal channel at luminance signal amplifier 17 is also fed to first means for deriving a first D.-C. voltage whose magnitude is proportional to the level of the luminance signal in the luminance signal channel. More particularly, in the illustrated arrangement the magnitude of this first D.-C. voltage is proportional to the level of the line synchronizing pulses. These first means may comprise gating circuit 24 and amplifier filter 25. The output of gating circuit 24 consists of a series of pulses, each pulse corresponding to one of the line synchronizing pulses and having an amplitude equal to the amplitude of the line synchronizing pulses in the television signal at the output of the luminance signal amplifier with respect to the datum level at which the average value of the portion of the television signal following each line synchronizing pulse is maintained. The output of gating circuit 24 is amplified and smoothed by amplifier filter 25 to provide the first D.-C. voltage, which is also utilized as an AGC voltage for the luminance signal channel; this AGC voltage being applied in known manner to control the gain of the radio-frequency amplifier 11 and intermediate-frequency amplifier 14 and being further utilized as described below. To provide a contrast control in the receiver, the gains of the amplifiers 11 and 14 may be made manually variable in known manner.

A second D.-C. voltage similar to the above-described first D.-C. voltage is derived from the chrominance signals by feeding the output of the chrominance signal channel at the band-pass amplifier 18 to second means for deriving a second D.-C. voltage whose magnitude is proportional to the level of the chrominance signal in the chrominance channel. More particularly, in the illustrated arrangement the magnitude of this second D.-C. voltage is proportional to the level of the color-burst signals (sinusoidal color synchronizing signals) which are transmitted once every line. These second means may consist of a suitable gating circuit 26 which feeds a second amplifier filter 27. This second D.-C. voltage may be used as a chrominance channel AGC voltage to control the gain of the chrominance channel in the manner that the first D.-C. voltage is used to control the gain of the luminance channel, however, in the present arrangement the second D.-C. voltage is not so used.

The first and second D.-C. voltages are applied to third means for utilizing these two D.-C. voltages to derive a control signal, variations in which are indicative of variations in saturation, and for utilizing the control signal to maintain the control signal itself and saturation substantially at predetermined values. For example, these two voltages may be applied with opposite polarities to the ends of resistive potentiometer 28 and the voltage, appearing at a tapping point 29 on the potentiometer, fed back to the chrominance band-pass amplifier 18 so as to control its gain. The tapping point 29 may be a fixed or movable contact. If the point is fixed, it may be chosen so that the ratio of the resistance, between the tapping point and the end of the potentiometer to which the first D.-C. voltage is applied, to the resistance between the tapping point and the other end of the potentiometer is equal to the ratio of the first D.-C. voltage to the second D.-C. voltage when the picture is correctly reproduced with regard to the saturation of the colors. Thus, the voltage at the tapping point will be zero when the picture is correctly reproduced. It will be appreciated that the first and second D.-C. voltages are respectively proportional to the luminance signal level and the chrominance signal level at the kinescope. Therefore, with the tapping point correctly chosen along the voltage gradient developed between the two applied voltages, the voltage appearing at the tapping point on the potentiometer is always zero at the relevant ratio, whatever the actual levels of the luminance signal and chrominance signal.

In operation of the circuit, when the ratio of the levels of the luminance and chrominance signals at the kinescope changes from the value which corresponds with the correct reproduction of the picture, the amplitude ratio of the first D.-C. voltage derived from the luminance signals to the second D.-C. voltage derived from the chrominance signals changes proportionately. Consequently, when the ratio of the levels of the luminance and chrominance signals at the kinescope increases above the correct value, a voltage of one polarity appears at the tapping point on the potentiometer and when the ratio decreases, a voltage of the opposite polarity appears at the tapping point. This error voltage is utilized at the chrominance band-pass amplifier so that the gain of that amplifier is varied in such a sense as to maintain substantially constant the ratio of the levels of the first and second D.-C. voltages. If the tapping point is movable, it provides a saturation control, and the arrangement will then maintain the overall degree of saturation of the colors of the reproduced picture substantially constant at the level selected by the viewer.

Thus, it will be seen that the arrangement described also effectively provides AGC in the chrominance channel of the receiver; however, when the setting of the contrast control is changed, the gains of the luminance signal channel and the chrominance signal channel are changed proportionately and the resulting picture retains its original saturation.

In other arrangements in accordance with the invention, the voltage appearing at the tapping point on the potentiometer may be used to control the gain of the luminance signal channel in addition to or instead of the gain of the chrominance signal channel.

While there has been described what is at present considered to be the preferred embodiment of the present invention, it will be obvious to those skilled in the art that various changes and modifications may be made therein without departing from the true spirit and scope of the invention.

What is claimed is:

1. A color-television receiver comprising:

a source of modulated wave signals including a luminance signal channel for deriving a luminance signal and a chrominance signal channel for deriving a chrominance signal;

first means coupled to said source for deriving a first D.-C. voltage whose magnitude is proportional to the level of said luminance signal in said luminance channel;

second means coupled to said source for deriving a second D.-C. voltage whose magnitude is proportional to the level of said chrominance signal in said chrominance channel;

and third means for utilizing said first and second D.-C. voltages to derive a control signal, variations in which control signal are indicative of variations in saturation, and for utilizing said control signal to maintain said control signal and saturation at predetermined values.

2. A color-television receiver comprising:

a source of modulated wave signals including a luminance signal channel for deriving a luminance signal and a chrominance signal channel for deriving a chrominance signal;

first means coupled to said source for deriving a first D.-C. voltage whose magnitude is proportional to the level of said luminance signal in said luminance channel;

second means coupled to said source for deriving a second D.-C. voltage whose magnitude is proportional to the level of said chrominance signal in said chrominance channel;

potentiometer means coupled to said first and second means for developing a voltage gradient between the said first and second D.-C. voltages and including a tapping point between the voltages;

and means coupled to the tapping point for utilizing control signals appearing at said point to maintain said control signal and saturation at substantially predetermined values by controlling the gain of one of said channels.

3. A color-television receiver comprising:

a source of modulated wave signals including a luminance signal channel for deriving a luminance signal including line synchronizing pulses and a chrominance signal channel for deriving a chrominance signal including color-burst signals;

first means coupled to said source for deriving a first D.-C. voltage whose magnitude is proportional to the level of said line synchronizing pulses;

second means coupled to said source for deriving a second D.-C. voltage whose magnitude is proportional to the level of said color-burst signals;

a potentiometer having said first and second D.-C. voltages applied with opposite polarities to opposite ends and having a tapping point between said ends;

and means coupled to the tapping point for utilizing control signals appearing at said point for controlling the gain of one of said channels so as to maintain substantially zero control signal amplitude at said point thereby maintaining substantially proper saturation.

4. A color-television receiver comprising:

a source of modulated wave signals including a luminance signal channel for deriving a luminance signal and a chrominance signal channel for deriving a chrominance signal;

first means coupled to said source for deriving a luminance channel AGC voltage;

second means coupled to said source for deriving a chrominance channel AGC voltage;

and third means for utilizing said AGC voltages to derive a signal, variations in which are indicative of variations in saturation, and for utilizing said signal to maintain the signal and saturation substantially at predetermined values.

5. A color-television receiver comprising:

a source of modulated wave signals including a luminance signal channel for deriving a luminance signal and a chrominance signal channel for deriving a chrominance signal;

first means coupled to said source for deriving a luminance channel AGC voltage whose magnitude is proportional to the level of the line synchronizing pulses;

second means coupled to said source for deriving a chrominance channel AGC voltage whose magnitude is proportional to the level of the color-burst signals;

and third means for utilizing said AGC voltages to derive an error signal the magnitude and polarity of which are indicative of saturation error and for utilizing said signal to maintain substantially zero error signal and proper saturation.

6. A color-television receiver comprising:

a source of modulated wave signals including a luminance signal channel for deriving a luminance signal and a chrominance signal channel for deriving a chrominance signal;

first means coupled to said source for deriving a luminance channel AGC voltage;

second means coupled to said source for deriving a chrominance channel AGC voltage;

potentiometer means coupled to said first and second means for developing a voltage gradient between the two said AGC voltages and including a tapping point between the voltages;

and means coupled to the tapping point utilizing signals appearing at said point to maintain the signal appearing at said point and saturation at substantially predetermined values by controlling the gain of one of said channels.

7. A color-television receiver comprising:

a source of modulated wave signals including a luminance signal channel for deriving a luminance signal and a chrominance signal channel for deriving a chrominance signal;

first means coupled to said source for deriving a luminance channel AGC voltage;

second means coupled to said source for deriving a chrominance channel AGC voltage;

a potentiometer having said AGC voltages applied with opposite polarities to opposite ends and having a tapping point between said ends;

and means coupled to the tapping point utilizing signals appearing at said point for controlling the gain of one of said channels so as to maintain substantially zero signal amplitude at said point thereby maintaining substantially proper saturation.

References Cited by the Examiner

UNITED STATES PATENTS

| | | | |
|---|---|---|---|
| 2,798,900 | 7/1957 | Bradley | 178—5.4 |
| 2,841,643 | 7/1958 | Loughlin | 178—5.4 |
| 2,894,061 | 7/1959 | Oakley et al. | 178—5.4 |
| 2,913,519 | 11/1959 | Macovski | 178—5.4 |
| 2,948,775 | 8/1960 | Larky et al. | 178—5.4 |

DAVID G. REDINBAUGH, *Primary Examiner.*

J. A. O'BRIEN, *Assistant Examiner.*